Oct. 28, 1952   G. E. R. MURRAY ET AL   2,615,367
REFLECTING MEASURING DEVICE WITH DUAL SENSITIVITY
Filed Sept. 3, 1947   3 Sheets-Sheet 1
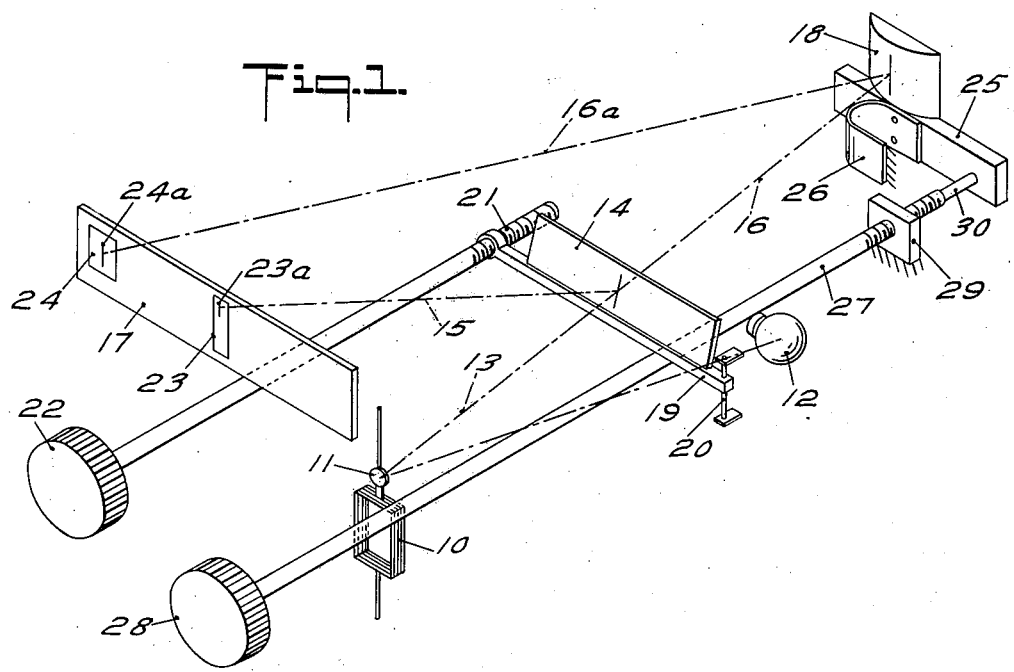
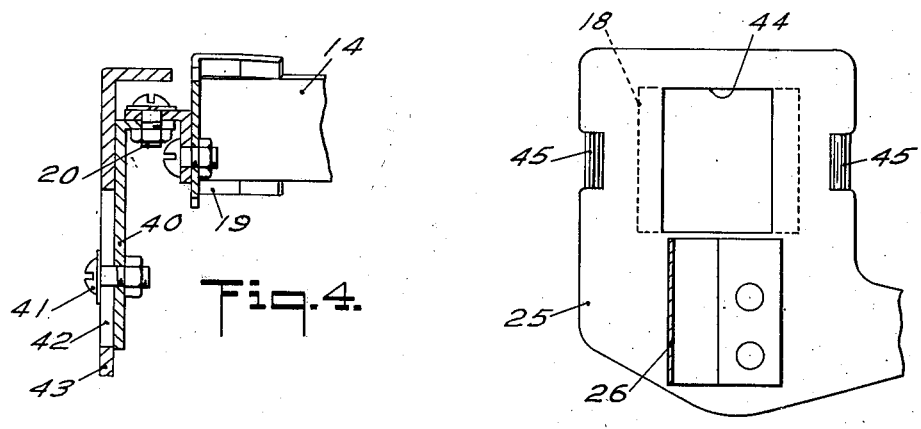
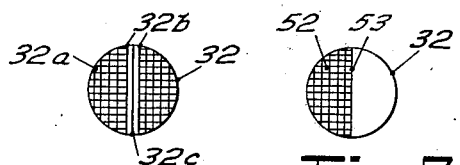
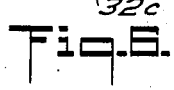
INVENTORS
GEORGE E. R. MURRAY
BENJAMIN J. WILSON
BY
Woodcock and Phelan
ATTORNEYS

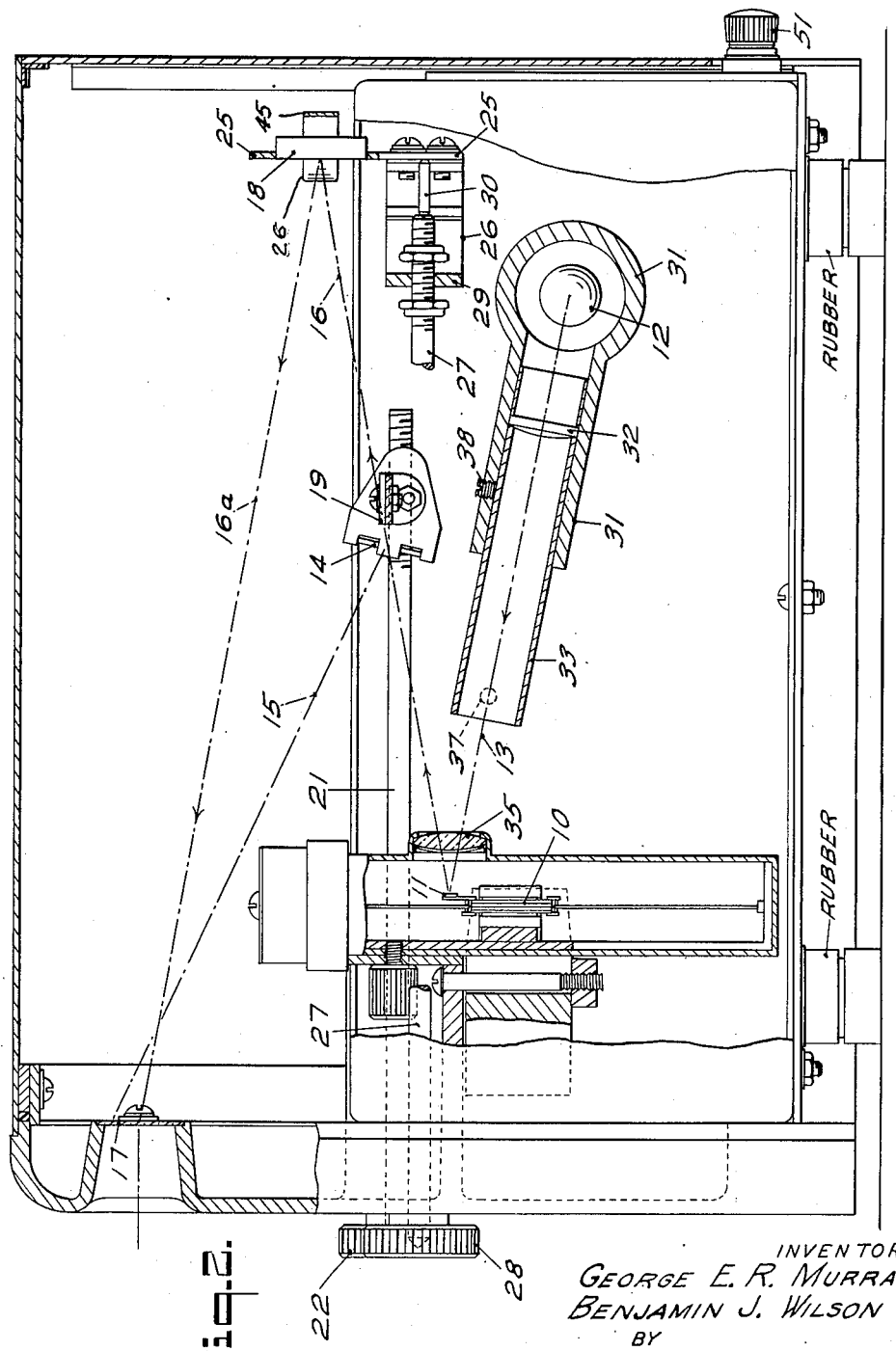

Oct. 28, 1952  G. E. R. MURRAY ET AL  2,615,367
REFLECTING MEASURING DEVICE WITH DUAL SENSITIVITY
Filed Sept. 3, 1947  3 Sheets-Sheet 3

INVENTORS
GEORGE E. R. MURRAY
BENJAMIN J. WILSON
BY
Woodcock and Phelan
ATTORNEYS Patented Oct. 28, 1952

2,615,367

UNITED STATES PATENT OFFICE 2,615,367

REFLECTING MEASURING DEVICE WITH DUAL SENSITIVITY

George E. R. Murray, Feasterville, and Benjamin J. Wilson, Oreland, Pa., assignors to Leeds and Northrup Company, Philadelphia, Pa., a corporation of Pennsylvania Application September 3, 1947, Serial No. 771,980

10 Claims. (Cl. 88—74)

This invention relates to dual sensitivity measuring instruments of the type in which two components of a light beam are respectively directed on a scale, one of which is movable with respect thereto with a greater sensitivity than the other. In instruments of this type, there has arisen the problem of adjusting the zero indication of either or both components and independently adjusting the position of one component relative to the other. Such problems, due to the high sensitivity of the instrument, arise because of the fact that slight changes in the positions of the optical elements of the system undesirably shift the components.

In carrying out the invention in one form thereof, either the high sensitivity beam or component or the low sensitivity beam or component may be independently adjusted to correspond with a zero or other selected position on a scale. More particularly, the primary beam of light reflected from the sensitive element or galvanometer is directed to a light-transmitting and reflecting element which is adjustably mounted for angular movement with respect to the light beam. Thus, a change in the angle produces movement of the low sensitivity component of the light beam by changing the angle of reflection without angularly changing the path of the component transmitted therethrough. The transmitted component, representing the high sensitivity beam, is directed onto a cylindrically curved reflecting surface for amplification of deflections. By adjustably mounting the curved reflecting surface for translational movement, as about an axis disposed from but parallel to the axis of curvature, the high sensitivity component may be moved relative to the scale without affecting the position of the low sensitivity component. The importance of these adjustments, apparent to those skilled in the art, will be later more fully developed.

For a more detailed description of the invention and for further objects and advantages thereof, reference is to be had to the following description taken in conjunction with the accompanying drawings in which:

Fig. 1 diagrammatically illustrates the essential elements of a measuring system embodying the invention;

Fig. 2 is a side elevation, partly in section, of a typical embodiment of the invention;

Fig. 4 is a sectional view taken on the line 4—4 of Fig. 3;

Fig. 5 is a sectional view taken on the line 5—5 of Fig. 3; and

Figs. 6 and 7 illustrate preferred forms of index lines included as a part of the optical system.

Figure 3:
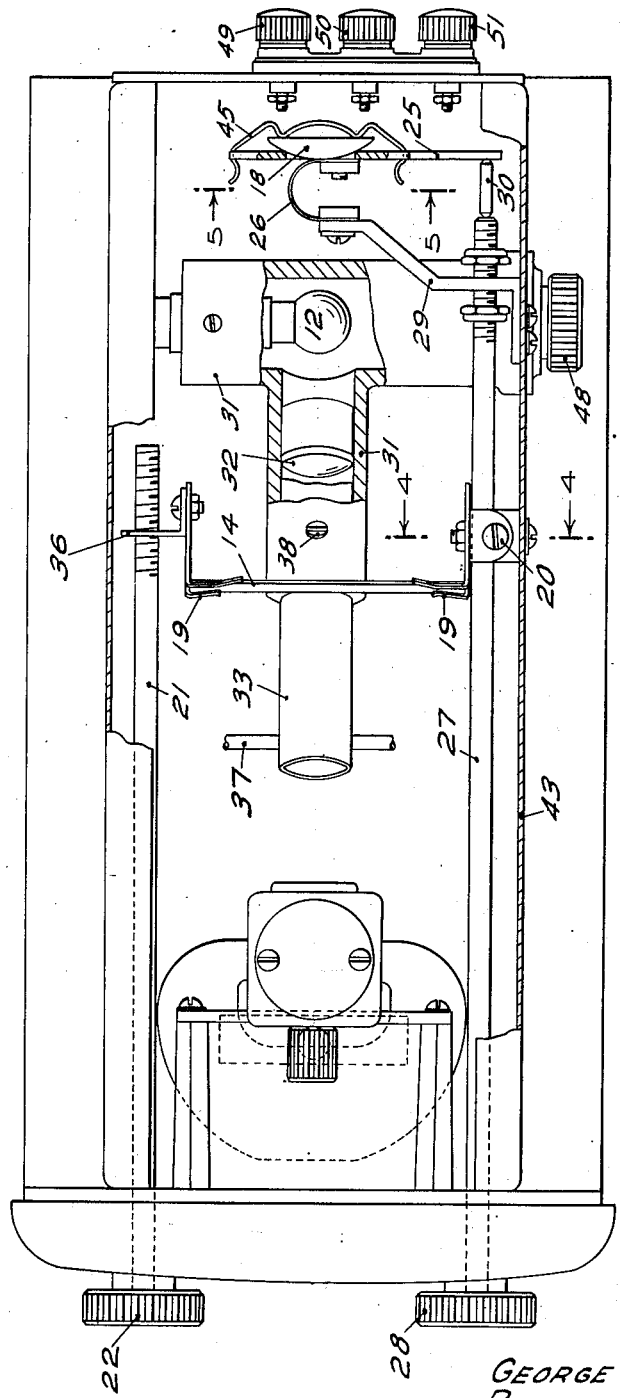
Fig. 3 is a plan view of Fig. 2.

Referring to the drawings, the measuring instrument includes a sensitive element movable in accordance with the magnitude of a condition and illustrated in the form of a galvanometer coil 10 having a mirror 11 supported therefrom for reflecting a light beam directed thereon from a light source 12. The beam 13 as it leaves the mirror 11 strikes a light-transmitting and reflecting optical element 14 which may be of glass. The beam 13 is divided by the element 14 into two components 15 and 16, the former the reflected component 15 being directed on a translucent scale 17. The transmitted component 16 of the beam strikes the cylindrically curved surface of a reflector 18, and the re-directed component 16a extends generally in the same direction as the reflected component and so as to strike the scale 17. The radius of curvature of reflector 18, in one embodiment of the invention, was 34 millimeters.

By adjustably mounting the element 14, as by supporting it from an adjustable mount comprising a bracket 19 pivoted at 20 and rotatable about that pivot by means of a threaded rod 21 carrying an adjusting knob 22, the angle of reflection of the component or beam 15 may be changed as desired. Angular adjustment of the element 14, however, does not angularly change the direction of the transmitted component or beam 16. Accordingly, the position on the scale 17 of a low sensitivity spot 23 may be shifted without affecting the position on the scale of a high sensitivity spot 24.

The transmitted component 16 strikes the curved surface of the reflector 18, and is, of course, re-directed to the scale 17. If there is deflection of the component 16 away from its illustrated position and transversely along the curved surface, the reflected component 16a will move in magnified relation to the deflection of the component 16. The degree of magnification of deflection of the component 16 will depend upon the radius of curvature of the reflector 18, the shorter the radius, the greater the magnification. Thus, the reflector 18 performs two functions; the magnification of deflections since it is a light-diverging optical element acting as a negative lens, and the re-directing of the transmitted component since it includes a reflecting surface. By adjustably mounting the reflector 18 for change of the angle of reflection, the position of the high sensitivity spot 24 on the scale 17 may be changed as desired without affecting the position of the spot 23.

In the preferred form of the invention, the reflector 18 is supported from an adjustable mount comprising a member 25 which is itself carried by a U-shaped spring 26, one end of which is stationary. By means of a threaded rod 27 having a knob 28, the member 25 may be moved in either direction. The rod 27 is spaced to the right of coil 10 as viewed in Fig. 1. The provision of the U-shaped spring 26 causes translational movement of the reflector 18, that is, it effectively bodily moves the reflector 18 to the left, as viewed from mirror 11, when the rod 27 is screwed inwardly through its threaded stationary support 29, and vice versa. As already explained, such translational movement changes the angle of reflection of the component 16 and thus moves the high sensitivity spot 24 to the right or to the left on the scale 17, depending upon the direction of the adjustment. Since the movement of reflector 18 is largely translational, rather than rotational, the adjusting rod 27 has disposed between its end and the member 25 a link 30 having its respective ends pointed and engaging hemispherical depressions respectively in the end of the rod 27 and the member 25. Thus, the freedom of movement of the link 30 eliminates sliding friction between rod 27 and member 25 due to the translational movement of the member 25.

With the foregoing explanation of the invention in mind, reference may now be had to a commercial embodiment thereof in which additional structural details have been illustrated.

Referring to Figs. 2-6, where corresponding parts have been given like reference characters, it will be observed the light source 12 consists of a lamp enclosed within a housing 31, light therefrom passing outwardly through a condensing lens 32 and the tube 33. In order to provide index lines 23a and 24a for the high and low sensitivity spots 23 and 24 as they appear on the scale 17, the condensing lens 32, as shown in Fig. 6, is preferably coated with opaque material 32a over all except a central portion 32b, across which there is inscribed or located an index line 32c. The result is a beam 13 of relatively narrow width. The beam 13 passes through a lens 35 of such a focal length as to bring the image of the line 32c into focus in the neighborhood of the virtual focus of the reflector 18. The image of line 32c is reflected from the surface of the reflector 18 and is substantially in focus at the scale 17. The low sensitivity image of the line 32c is also in focus in the spot 23 since the length of the optical path from the lens 35 to the scale 17 is selected for that result. The low sensitivity spot 23 may be brought into sharp focus by moving the glass member or element 14 along the path of beam 13 without affecting the focus of the image appearing in the high sensitivity spot 24. In this manner, the index lines 23a and 24a on the low sensitivity and high sensitivity spots 23 and 24 remain in focus, notwithstanding the fact that the optical path for the high sensitivity spot 24 is made a great deal longer than the optical path for the low sensitivity spot 23. The greater sensitivity, i. e., the greater movement of the high sensitivity spot 24 for a given deflection of the mirror 11, results from both the greater length of the optical path and from the magnification produced by the curved surface of reflector 18. The sensitivity is so great (in one modification fifteen times that of the low sensitivity spot) that the slightest movement of reflector 18 results in a substantial change in position of the high sensitivity spot 24. Accordingly, the independent adjustment of that spot will likely be utilized each time the measuring instrument is used; and sometimes during use thereof if mechanical disturbance, ambient temperature and the like should cause any mechanical movement of reflector 18 or of other parts of the instrument which may cause movement of the index lines 23a and 24a on scale 17.

Were it necessary to adjust the positions of spots 23 and 24 by rotational movement of the galvanometer, as by rotation of one of the galvanometer suspension supports, both spots would move and it would then be necessary to adjust one or the other until both were located on the scale 17 in the desired positions. In accordance with the invention, however, the high and low sensitivity spots 23 and 24 may be adjusted without disturbing either of the galvanometer suspension supports, and there is avoided the need to wait for equilibrium to obtain in the galvanometer after a rotational adjustment of the coil 10 and its mirror 11.

Continuing with further details of the commercial embodiment of the invention, it will be observed that the adjusting rods 21 and 27 are located on opposite sides of the instrument. It is to be understood, of course, that one may be located above the other providing the pivot 20 and the threaded bracket 36 be interchanged. For convenience, the condensing lens 32 is mounted in the tube 33, which, it will be observed, is telescopically carried by the housing 31. The tube 33, by means of a rod 37, may be rotated to maintain the index lines 23a and 24a in a vertical position. In general, this will be a factory adjustment, a set screw 38 being provided to hold the tube 33 stationary after proper adjustment thereof.

The adjusting means for the glass reflector 14, as before described, includes a pivot 20 which, Fig. 4, it will be observed includes a spring washer in the assembly. The pivot 20 also extends through the horizontal arm of a vertically extending bracket 40 which is adjustably secured as by a screw 41 to a slot 42 provided in the housing 43. The rod 21 is held against axial movement by a collar (not shown) adjacent and behind the front panel of the housing.

The reflector-supporting member 25, Fig. 5, is provided with a rectangular opening 44 through which the cylindrically curved reflector 18 partly extends. It is held in position by means of a spring clip 45 having arms which engage the member 25, Fig. 3, and which resiliently press the reflector 18 into the opening 44. This arrangement provides a self-centering mount for the cylindrically curved reflector 18.

Access to the lamp housing is by way of a closure member 48 and electrical connections may be made by means of binding posts 49, 50 and 51, two for the galvanometer coil 10 and one for a shield ground connection. The lamp 12 is supplied through any convenient means such as a flexible cord.

A modified form of index line of any suitable type may be utilized. For example, Fig. 7, the condensing lens 32 may be coated as at 52 with an opaque material such as black paint to form a line across a diameter 53 thereof. The semi-circular uncoated half of the lens 52 will then be imaged on the scale 17. Readings will be with reference to the diameter 53.

While a preferred form of the invention has been described, it will be understood modifications may be made within the scope of the appended claims.

What is claimed is:

1. A measuring instrument of the type including an optical system in which a galvanometer mirror produces deflection of a light beam characterized by the inclusion in said optical system of an element for dividing said beam into a reflected component and a transmitted component, a light-diverging element interposed in the path of one of said components for amplifying any deflection thereof produced by deflection of said galvanometer mirror, a scale for determining the extent of deflection of said galvanometer mirror, and means including reflecting surfaces for bringing both components onto said scale, one for high sensitivity measurement of deflections and the other for low sensitivity measurement thereof comprising means for rotating said first-named element for angularly adjusting said reflected component without angular adjustment of said transmitted component for changing the position on the scale of said reflected component without changing the position thereon of said transmitted component.

2. A measuring instrument of the type including an optical system in which rotation of a galvanometer mirror produces deflection of a light beam characterized by the inclusion in said optical system of an element for dividing said beam into a reflected component and a transmitted component, a light-diverging element interposed in the path of one of said components for amplifying any deflection thereof produced by rotation of said galvanometer mirror, a scale for determining the extent of rotation of said galvanometer mirror, and means including reflecting surfaces for bringing both components onto said scale, one for high sensitivity measurement and the other for low sensitivity measurement thereof comprising means for optically shifting on said scale said transmitted component without affecting the position thereof of said reflected component.

3. A measuring instrument of the type including an optical system in which rotation of a galvanometer mirror produces deflection of a light beam characterized by the inclusion in said optical system of an element for dividing said beam into a reflected component and a transmitted component, a light-diverging element interposed in the path of one of said components for amplifying any deflection thereof produced by rotation of said galvanometer mirror, a scale for determining the extent of rotation of said galvanometer mirror, and means including reflecting surfaces for bringing both components onto said scale, one for high sensitivity measurement and the other for low sensitivity measurement thereof, comprising means for rotating said first-named element for angularly adjusting said reflected component without angular adjustment of said transmitted component for changing the position on the scale of said reflected component without changing the position thereon of said transmitted component, and means for optically shifting on said scale said transmitted component without affecting the position thereon of said reflected component.

4. A measuring instrument of the type including an optical system in which rotation of a galvanometer mirror about its supporting axis produces deflection of a light beam characterized by the inclusion in said optical system of a plane glass element for dividing said beam into a reflected component and a transmitted component, a cylindrically curved reflecting surface upon which said transmitted component is directed for amplifying deflections thereof and for re-directing said transmitted component in the same general direction as said reflected component, and a scale to which said components are directed for determining in two degrees of sensitivity by deflections of said components any rotation of the galvanometer mirror about its supporting axis, said cylindrically curved reflecting surface amplifying such rotation of said galvanometer mirror but being ineffective to amplify other movements of said galvanometer mirror.

5. A measuring instrument of the type including an optical system in which a galvanometer mirror produces deflection of a light beam characterized by the inclusion in said optical system of a plane glass element for dividing said beam into a reflected component and a transmitted component, a cylindrically curved reflector upon which said transmitted component is directed for amplifying deflections thereof and for re-directing said transmitted component in the same general direction as said reflected component, a scale to which said components are directed for determining in two degrees of sensitivity by deflections of said components any deflection of the galvanometer mirror about the supporting axis thereof, said curved reflector amplifying such deflections of said galvanometer mirror but being ineffective to amplify other movements of said galvanometer mirror, means for supporting said glass element for rotation about an axis displaced from the point of reception of said light beam thereon for changing its angular position with respect thereto for adjustment of the reflected component on said scale without angularly changing the component transmitted therethrough, and means for producing a translational movement of said curved reflector for adjustment of said transmitted component on said scale independently of said reflected component.

6. A measuring instrument of the type including an optical system in which a galvanometer mirror produces deflection of a light beam characterized by the inclusion in said optical system of a plane glass element for dividing said beam into a reflected component and a transmitted component, a cylindrically curved reflector upon which said transmitted component is directed for amplifying deflections thereof and for re-directing said transmitted component in the same general direction as said reflected component, a scale to which said components are directed for determining in two degrees of sensitivity by deflections of said components any deflection of the galvanometer mirror about the supporting axis thereof, said curved reflector amplifying such deflections of said galvanometer mirror but being ineffective to amplify other movements of said galvanometer mirror, means for supporting said glass element for rotation about an axis displaced from the point of reception of said light beam thereon for changing its angular position with respect thereto for adjustment of the reflected component on said scale without angularly changing the component transmitted therethrough, a supporting member carrying said curved reflector, a spring support therefor, said spring support having a shape such that rotational movement of one end of said supporting member produces translational movement of said curved reflector for adjustment of said transmitted component independently of said reflected component.

7. In a measuring instrument of the type including an optical system in which a movable member produces deflection of a light beam, the combination of a scale disposed to receive a high-sensitivity component of the light beam and a low-sensitivity component of the light beam for determining in two degrees of sensitivity the extent of any movement of said movable member, a light-transmitting and reflecting optical element disposed in the path of the light beam for dividing the beam into a reflected component and a transmitted component, a light-diverging optical element interposed in the path of one of said components for increasing the deflection thereof produced by any movement of said movable member to a greater extent than the other component of said beam, and means including said optical elements for directing said components upon said scale.

8. In a measuring instrument of the type including an optical system in which a movable member produces deflection of a light beam, the combination of a scale disposed to receive a high-sensitivity component of the light beam and a low-sensitivity component of the light beam for determining in two degrees of sensitivity the extent of any movement of said movable member, a light-transmitting and reflecting optical element disposed in the path of the light beam for dividing the beam into a reflected component and a transmitted component, a light-diverging optical element interposed in the path of one of said components for increasing the deflection thereof produced by any movement of said movable member to a greater extent than the other component of said beam, means including said optical elements for directing said components upon said scale for high-sensitivity and low-sensitivity indication upon movement of said movable member, and an adjustable mount for each optical element for independently varying the position of each component upon said scale without affecting the position of the other component.

9. In a measuring instrument of the type including an optical system in which a galvanometer mirror produces deflection of a light beam in response to change in the magnitude of a condition, the combination of a scale disposed to receive a high-sensitivity component of the light beam and a low-sensitivity component of the light beam for determining in two degrees of sensitivity the extent of any movement of said mirror, a light-transmitting and reflecting optical element disposed in the path of the light beam reflected from said galvanometer mirror for dividing the reflected beam into a reflected component and a transmitted component, a light-diverging mirror interposed in the path of the transmitted component for increasing the deflection thereof produced by any movement of said galvanometer mirror to a greater extent than the other component of said beam, means including said optical element and said light-diverging mirror for directing said components upon said scale for high-sensitivity and low-sensitivity indication upon movement of said galvanometer mirror, and adjustable mounts for said optical element and said light-diverging mirror for independently varying the position of each component upon said scale without affecting the position of the other component.

10. In a measuring instrument including a movable member producing deflection of a light beam and a scale disposed to receive a high-sensitivity component of the light beam and a low-sensitivity component of the light beam for determining in two degrees of sensitivity the extent of any movement of said movable member, the combination of an optical element disposed in the path of the light beam deflected by said movable member for dividing the beam into a reflected component and a transmitted component, one of which is directed upon said scale, and optical means including light-diverging and light-reflecting structure disposed within the path of at least one of said components for producing a greater deflection of one of said components than the other respectively to provide said high-sensitivity and low-sensitivity components and for directing the other of said components upon said scale.

GEORGE E. R. MURRAY.
BENJAMIN J. WILSON.

REFERENCES CITED

The following references are of record in the file of this patent:

UNITED STATES PATENTS

| Number | Name | Date |
|---|---|---|
| 847,058 | Gaillard | Mar. 12, 1907 |
| 1,518,786 | Griswold | Dec. 9, 1924 |
| 1,859,020 | Brown | May 17, 1932 |
| 1,871,877 | Buckman | Aug. 16, 1932 |
| 1,938,992 | Baker et al. | Dec. 12, 1933 |
| 2,098,917 | Gunther | Nov. 8, 1937 |
| 2,107,936 | Gardner | Feb. 8, 1938 |
| 2,150,398 | Paulson | Mar. 14, 1939 |
| 2,172,166 | Lange | Sept. 5, 1939 |
| 2,232,177 | Ide | Feb. 18, 1941 |
| 2,417,704 | Rylsky | Mar. 18, 1947 |

FOREIGN PATENTS

| Number | Country | Date |
|---|---|---|
| 627,529 | Germany | Mar. 17, 1936 |